(12) United States Patent
Suzuki

(10) Patent No.: US 6,703,631 B2
(45) Date of Patent: Mar. 9, 2004

(54) INFRARED PROJECTOR

(75) Inventor: Hiroshi Suzuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/958,229

(22) PCT Filed: Feb. 5, 2001

(86) PCT No.: PCT/JP01/00798
§ 371 (c)(1),
(2), (4) Date: Oct. 5, 2001

(87) PCT Pub. No.: WO01/59518
PCT Pub. Date: Aug. 16, 2001

(65) Prior Publication Data
US 2002/0158210 A1 Oct. 31, 2002

(30) Foreign Application Priority Data
Feb. 7, 2000 (JP) .................................... 2000-029131

(51) Int. Cl.$^7$ .............................................. G01N 21/00
(52) U.S. Cl. ............................... 250/504 R; 250/493.1
(58) Field of Search ............................ 250/316.1, 493.1, 250/495.1, 504 R, 208.1, 216, 291; 359/355–356

(56) References Cited

U.S. PATENT DOCUMENTS

| | | | | |
|---|---|---|---|---|
| 5,457,493 A | * | 10/1995 | Leddy et al. ............... | 348/164 |
| 5,596,185 A | * | 1/1997 | Bross et al. .............. | 250/208.1 |
| 5,600,148 A | | 2/1997 | Cole et al. ............... | 250/495.1 |
| 5,633,755 A | | 5/1997 | Manabe et al. ............ | 359/443 |
| 5,689,321 A | | 11/1997 | Kochi ....................... | 349/143 |
| 6,486,474 B1 | * | 11/2002 | Owen et al. ........... | 250/339.02 |

FOREIGN PATENT DOCUMENTS

| | | |
|---|---|---|
| JP | A8-129138 | 5/1996 |
| JP | A9-98442 | 4/1997 |
| JP | A10-153755 | 6/1998 |

OTHER PUBLICATIONS

Skoog, et al., Principles of Instrumental Analysis, 1992, Saunder College Publishing, 4th Edition, pp. 89–91.*
Jones et al, SPIE, vol. 2742, pp. 25–37 (1996).

* cited by examiner

Primary Examiner—John R. Lee
Assistant Examiner—Christopher M. Kalivoda
(74) Attorney, Agent, or Firm—Birch, Stewart, Kolasch & Birch, LLP

(57) ABSTRACT

To provide an infrared projector in which it is not necessary to develop arrayed elements radiating infrared radiation, a high temporal resolution and a high spatial resolution are made available, the simulation of a high-temperature body is made possible, the wavelength and luminance characteristics are controlled, a high contrast and a high simulation accuracy are made available, and so on. A micromirror device (6) as an optical modulator for changing the direction of reflection by providing a plurality of mirrors and changing the direction of each of the plurality of mirrors independently, a controller (7) for controlling the direction of each mirror of the micromirror device, and infrared light sources (8, 9, and 10) for irradiating the micromirror device with infrared light are provided.

22 Claims, 6 Drawing Sheets

INFRARED SPECTRAL LUMINANCE
DISTRIBUTION INFORMATION
FROM COMPUTER

INFRARED SPECTRAL LUMINANCE
DISTRIBUTION INFORMATION
FROM COMPUTER

INFRARED PROJECTOR

This application is the national phase under 35 U.S.C. § 371 of PCT International Application No. PCT/JP01/00798 which has an International filing date of Feb. 5, 2001, which designated the United States of America.

TECHNICAL FIELD

This invention relates to an infrared projector for projecting infrared radiation analogous to two-dimensional infrared spectral luminance distribution information about an infrared scene, etc., produced by a computer, etc, based on the luminance distribution information. For example, the infrared projector is used in the evaluation of infrared equipment in such a way that an infrared image can be obtained by imaging infrared radiation projected by the projector using an infrared imaging device, that the infrared spectral luminance data and the infrared image are compared, and that the imaging capability of the infrared imaging device is evaluated by the degree of degradation of the infrared image.

BACKGROUND ART

FIG. 5 is a conventional infrared projector shown in George C. Goldsmith, "Characterization measurement of the wideband infrared scene projector resistor array", SPIE, Vol. 2742, P25–37(1996). A fine heating element array 1, a controller 2 for the fine heating element array 1, and a projecting reflector 3 for projecting infrared radiation radiated from the fine heating element array 1 are shown.

Next, the operation is described. As fine heating elements are arranged as a two-dimensional array in the fine heating element array 1, a two-dimensional infrared spectral luminance distribution can be produced by making the heating value of each heating element different from that of the others. Each heating element is composed of a resistor, and the amount of infrared radiation can be adjusted by changing the voltage applied to the resistor.

The controller 2 receives the two-dimensional infrared spectral luminance distribution information of an infrared scene, etc., produced by a computer, etc., converts the spectral luminance distribution into a voltage distribution which is applied to each heating element, and controls the voltage to be applied to each heating element. When constructed in this way, the infrared radiation radiated from the fine heating element array 1 is imaged by using the infrared imaging device and then an infrared image can be obtained.

FIG. 6 shows a part of the fine heating element array 1. A resistor 4 in FIG. 6 is connected to the controller 2 through a lead wire 5. When a voltage is applied to the resistor 4 from the controller 2, current flows through the resistor 4 and heat is generated. The relation between the voltage V and the amount of heat generation P in the resistor 4 having a resistance R is expressed by $P=V^2/R$.

As infrared radiation is radiated from the resistor 4 in proportion to the heat generated, the amount of infrared radiation radiated by the resistor 4 can be controlled by controlling the voltage applied to the resistor 4 by the controller 2.

As thermal diffusion takes place when air exists around the fine heating element array 1, the radiation efficiency of infrared radiation to be radiated from the fine heating element array 1 is reduced. Therefore, the fine heating element array 1 is placed in a vacuum package (not illustrated in particular). Moreover, the infrared radiation to be radiated from the fine heating element array 1 is transmitted out of the package through a ZnSe window having good transmittance characteristics over a wide frequency band.

Furthermore, in order to improve the temporal response when the fine heating element array 1 changes from a high temperature to a low temperature, the heat is dissipated through a lead wire 5. When the amount of the heat dissipation is increased too much, however, the fine heating element does not achieve the desired temperature. Thus, the amount of heat dissipation and the ability to improve the temporal response time is limited. In other words, the temporal response in temperature change from a high temperature to a low temperature is quite unfavorable in this projector.

Next, the characteristics of infrared radiation radiated from the fine heating element array 1 are described. FIG. 7 shows the wavelength characteristic of the amount of infrared radiation in the infrared projector, where the horizontal axis represents wavelength and the vertical axis represents the intensity of the infrared radiation. The characteristic of the fine heating element array 1 is indicated by M in FIG. 7, and the characteristic of infrared radiation radiated by a black-body at the same temperature as that of the fine heating element array 1 is indicated by 762 K. The maximum temperature at which projection can be made using the projector is 762 K, and projection at temperatures higher than this cannot be made otherwise serious errors will occur.

Furthermore, the reason why the amount of infrared radiation of the fine heating element array 1 is lower when compared to that of a black-body light source is that the degree of integration of the heating elements is low and the infrared emissivity of the heating elements themselves is low (it is estimated to be 0.6 in the paper concerned). In this way, when the amount of infrared radiation is low, the infrared projector has lower contrast and becomes difficult to use.

In the conventional infrared projector constructed as in the above, a) it was required to newly develop a fine heating element array for specialized use in an infrared projector, and the heating element array was expensive, b) because the temporal response to temperature changes is poor since heating elements are used, and because a spacing is required between elements in the array as the heating elements need lead wires, and further because of some other reasons, the temporal resolution and spatial resolution were poor, c) because the temperature of the fine heating element is limited, the simulation of a high-temperature body could not be performed, d) the intensity distribution of infrared radiation generated by the fine heating element array had poor contrast, the accuracy of the simulation was poor, and some other problems existed.

SUMMARY OF THE INVENTION

The present invention was made in order to solve the problems described above, and it is an object of the present invention to provide an infrared projector in which it is not necessary to develop arrayed elements radiating infrared radiation, a high temporal resolution and a high spatial resolution are obtained, the simulation of a high temperature body is obtained, the wavelength and luminance characteristics are controlled, a high contrast and a high simulation accuracy are made available, and so on.

Considering the above-mentioned objects, an infrared projector of the present invention comprises a micromirror device as an optical modulator for changing the direction of reflection by providing a plurality of mirrors and changing the direction of each of the plurality of mirrors independently, a controller for controlling the direction of each mirror of the micromirror device, and an infrared light source for irradiating the micromirror device with infrared light.

Furthermore, in the present invention, a high-temperature black-body furnace is provided as the infrared light source.

Furthermore, in the present invention, an infrared wavelength selection means for selecting the wavelength of infrared radiation incident on the micromirror device is provided.

Furthermore, in the present invention, two or more bandpass filters having different passbands are provided as the infrared wavelength selection means.

Furthermore, in the present invention, a diffraction grating is provided as the infrared wavelength selection means.

Furthermore, in the present invention, movable supporting means for tilting the diffraction grating with respect to incident direction of infrared radiation is provided as the infrared wavelength selection means.

Furthermore, in the present invention, two or more diffraction gratings having different grating pitches are provided as the infrared wavelength selection means.

Furthermore, in the present invention, a prism is provided as the infrared wavelength selection means.

Furthermore, in the present invention, a movable supporting means for tilting the prism with respect to the incident direction of infrared radiation is provided as the infrared wavelength selection means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given herein below and the accompanying drawings, which are given by way of illustration only, and thus are not limitative of the present invention.

BEST MODE FOR CARRYING OUT THE INVENTION

Hereinafter, the present invention is described according to individual embodiments.

Embodiment 1

Figure 1:
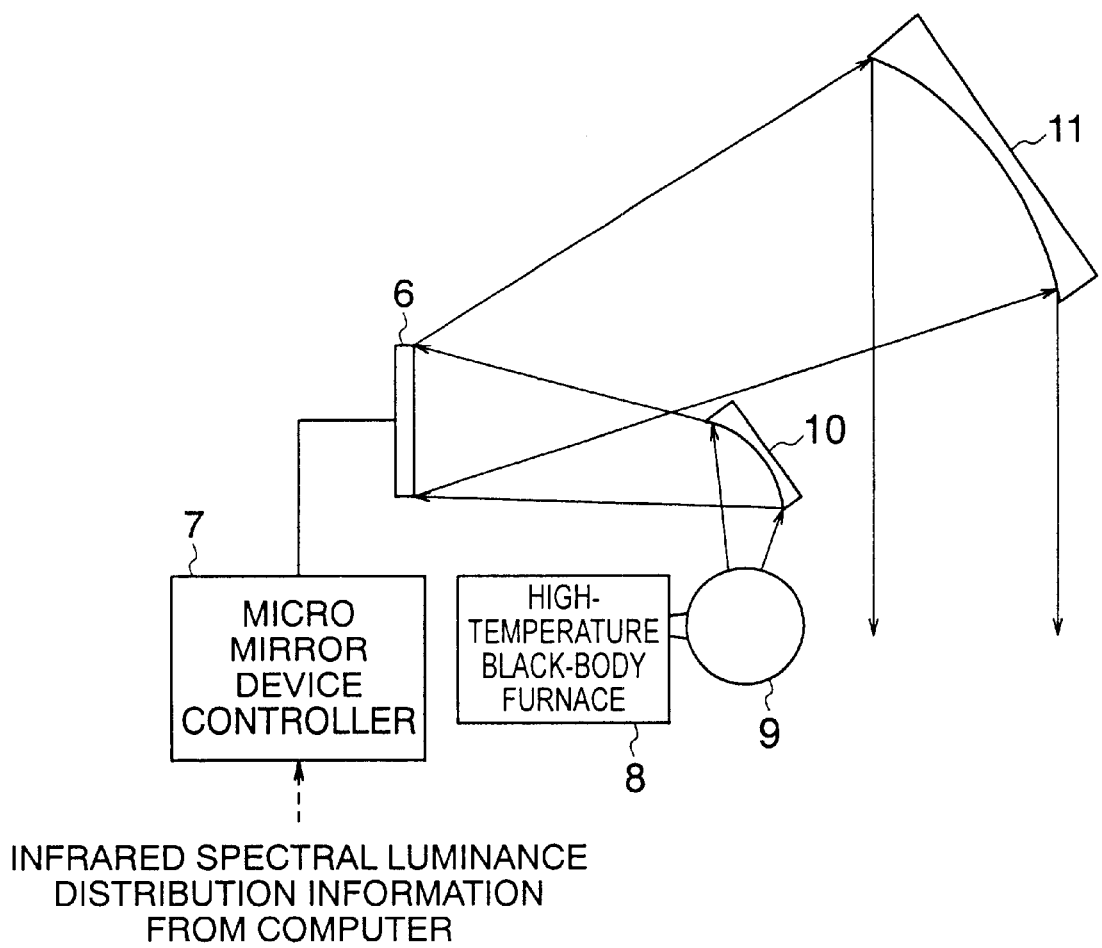
FIG. 1 shows the construction of an infrared projector according to one embodiment of the present invention.

FIG. 1 shows the construction of an infrared projector according to one example of the present invention. In the drawing, a micromirror device 6, a controller 7 for the micromirror 6, a high-temperature black-body furnace 8 as an infrared light source for irradiating the micromirror device 6 with infrared light, an integrating sphere 9 for irradiating the micromirror device 6 uniformly with the infrared radiation radiated from the high-temperature black-body furnace 8, a relay reflector 10 for irradiating the micromirror device 6 efficiently with the infrared radiation from the integrating sphere 9, and a projecting reflector 11 for projecting a two-dimensional infrared radiation distribution generated by the micromirror device 6 are shown. Moreover, the high-temperature black-body furnace 8, the integrating sphere 9, and the relay reflector 10 constitute the infrared light source.

Next, the operation is described. Infrared light is radiated from the inner surface of the high-temperature black-body furnace 8 which is at an elevated temperature and shows good infrared radiation, and is incident on the integrating sphere 9. As the infrared light is subjected to multiple reflections inside the integrating sphere 9, infrared light having a uniform radiation characteristic and distribution can be obtained from the radiation output portion of the integrating sphere 9. The infrared light is gathered on the surface of the micromirror device 6 by the relay reflector 10 to increase the amount of infrared light incident on the surface of the micromirror device 6.

In the micromirror device 6, mirrors of 16 μm square (not particularly illustrated) with a 17 μm pitch are arranged as a two-dimensional array, and the direction of radiation light is changed by changing the tilt of each mirror using a voltage applied from the controller 7. That is, the intensity of infrared light can be modulated in such a way that, in each mirror, when the infrared light is desired to be projected, the infrared light is made to be reflected in the direction of the projecting reflector 11, and when the infrared light is not to be projected, the infrared light is reflected in the direction outside the aperture of the projecting reflector 11. Since the time required to change the tilting of the mirror of the micromirror device 6 is 10 μsec or less than 10 μsec, the infrared light can be modulated at high speed.

As described in the above, as the temporal response regarding the change of the intensity of infrared radiation is fast because the micromirror device 6 is used and the mirrors for performing modulation are spatially densely arranged, the infrared projector can have a high temporal resolution and a high spatial resolution.

Furthermore, as the aperture ratio is high and the reflectivity is high, a high-contrast simulation can be performed.

Furthermore, as a high-temperature black-body furnace is used, a simulation of a high-temperature body such as a flame, etc., which was not possible in the past can be performed.

Embodiment 2

Figure 2:
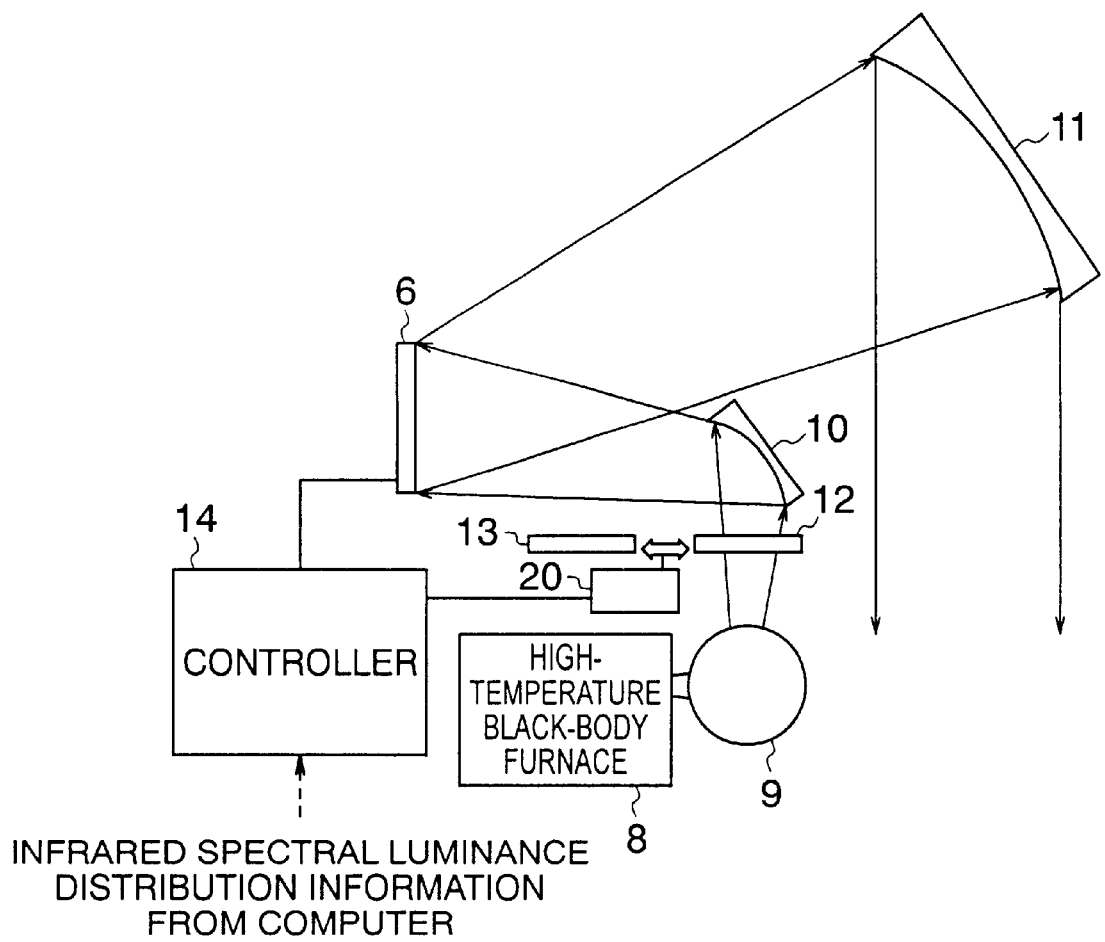
FIG. 2 shows the construction of an infrared projector according to another embodiment of the present invention.

In EMBODIMENT 1 described above, only the luminance characteristic is controlled, but next, an example in which the luminance and wavelength characteristics can be simultaneously controlled is shown. FIG. 2 shows the construction of an infrared projector according to another example of the present invention in such a case.

A bandpass filter 12, a bandpass filter 13 having a passband different from that of the bandpass filter 12, a wavelength and luminance controller 14 for the bandpass filters 12 and 13 and the micromirror device 6, and a movable supporting means 20 for switching the bandpass filters 12 and 13 and fixing and supporting either of them at a desired location under the control of the controller 14 are shown, and the other components are the same as in EMBODIMENT 1. Moreover, the bandpass filters 12 and 13 and the moveable supporting means 20 constitute an infrared wavelength selection means.

Next, the operation is described. The controller 14 receives the infrared spectral luminance distribution information from a computer and controls the wavelength characteristic by controlling the bandpass filters 12 and 13 and the micromirror device 6.

Hereinafter, one micromirror in a two-dimensional arrangement is selected and its operation is described. Based on the infrared luminance information in the passband of the bandpass filter 12 given by a computer, the controller 14 adjusts the tilting of the micromirror so that infrared radiation enters the projecting reflector 11 for a time period corresponding to the luminance. By making the bandpass filter 13 have the same function as the bandpass filter 12, the luminance of infrared radiation for the wavelengths divided by the filters can be accurately projected.

Moreover, in EMBODIMENT 2, two kinds of bandpass filters were used, and it is apparent that the more the wavelengths are divided, the more the accuracy of the wavelength characteristics is improved. Accordingly, three or more kinds of bandpass filters may be used.

Embodiment 3

Figure 3:
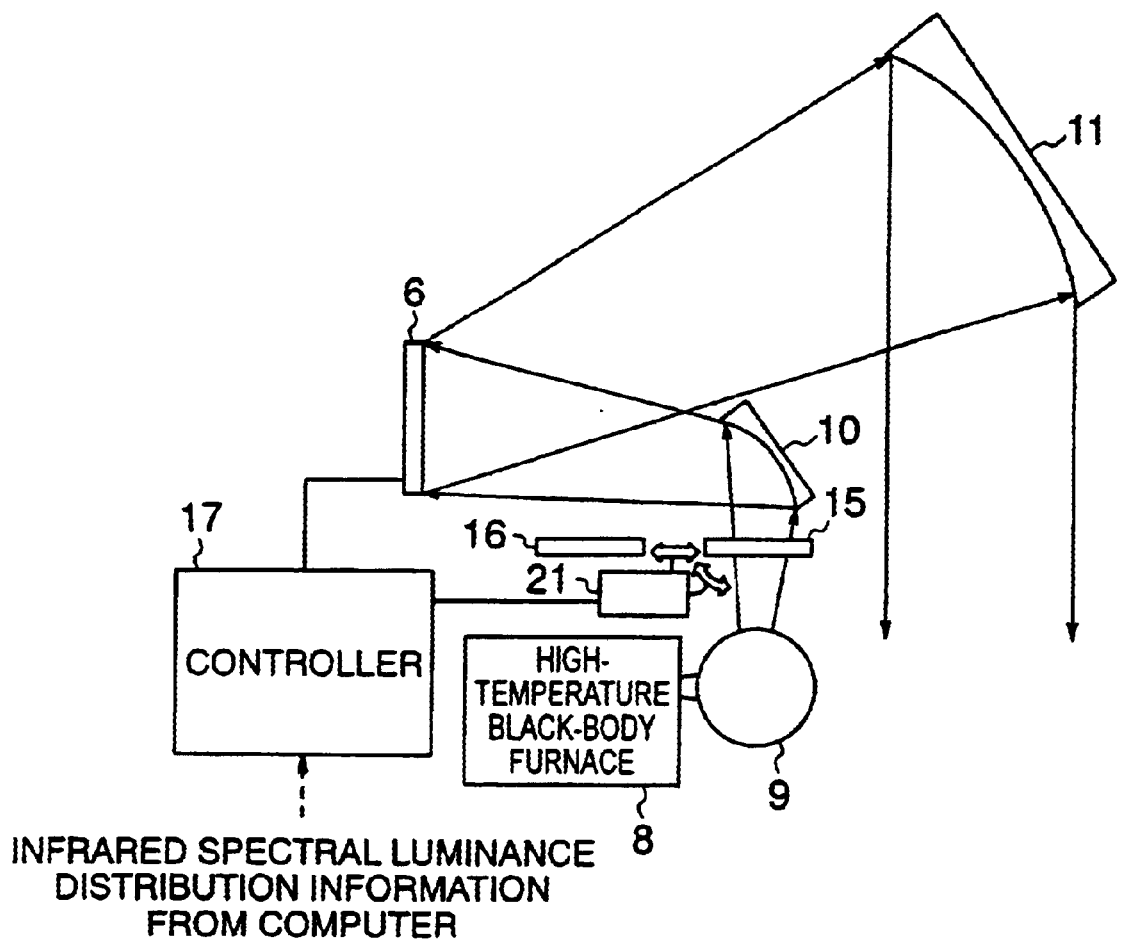
FIG. 3 shows the construction of an infrared projector according to another embodiment of the present invention.

In EMBODIMENT 2 described above, the bandpass filters were used as optical elements for limiting the passband, but next, an example using diffraction gratings is shown as an optical element for limiting the passband. FIG. 3 shows the construction of an infrared projector according to another example of the present invention in such a case.

A diffraction grating 15, a diffraction grating 16 having a different grating pitch from that of the diffraction grating 15, a controller 17 for the diffraction gratings 15 and 16 and the micromirror device 6, a movable supporting means 21 for switching the diffraction gratings 15 and 16 and fixing and supporting either of them at a desired location with a desired tilting in accordance with control of the controller 17 are shown, and the other components are the same as in EMBODIMENT 1. Moreover, the diffraction gratings 15 and 16 and the movable supporting means 21 constitute an infrared wavelength selection means.

Next, the operation is described. The diffraction gratings 15 and 16 limit the passband of the infrared radiation entering the micromirror device 6 in the same way as the bandpass filters in EMBODIMENT 2. Based on the infrared luminance information in the passband of the diffraction grating 15 given by a computer, the controller 17 adjusts the tilting of the micromirror so that infrared radiation enters the projecting reflector 11 for a time period corresponding to the luminance. By making the diffraction grating 16 do the same job as the diffraction grating 15, the luminance of infrared radiation for the wavelengths divided by the diffraction gratings can be accurately projected.

Figure 4:
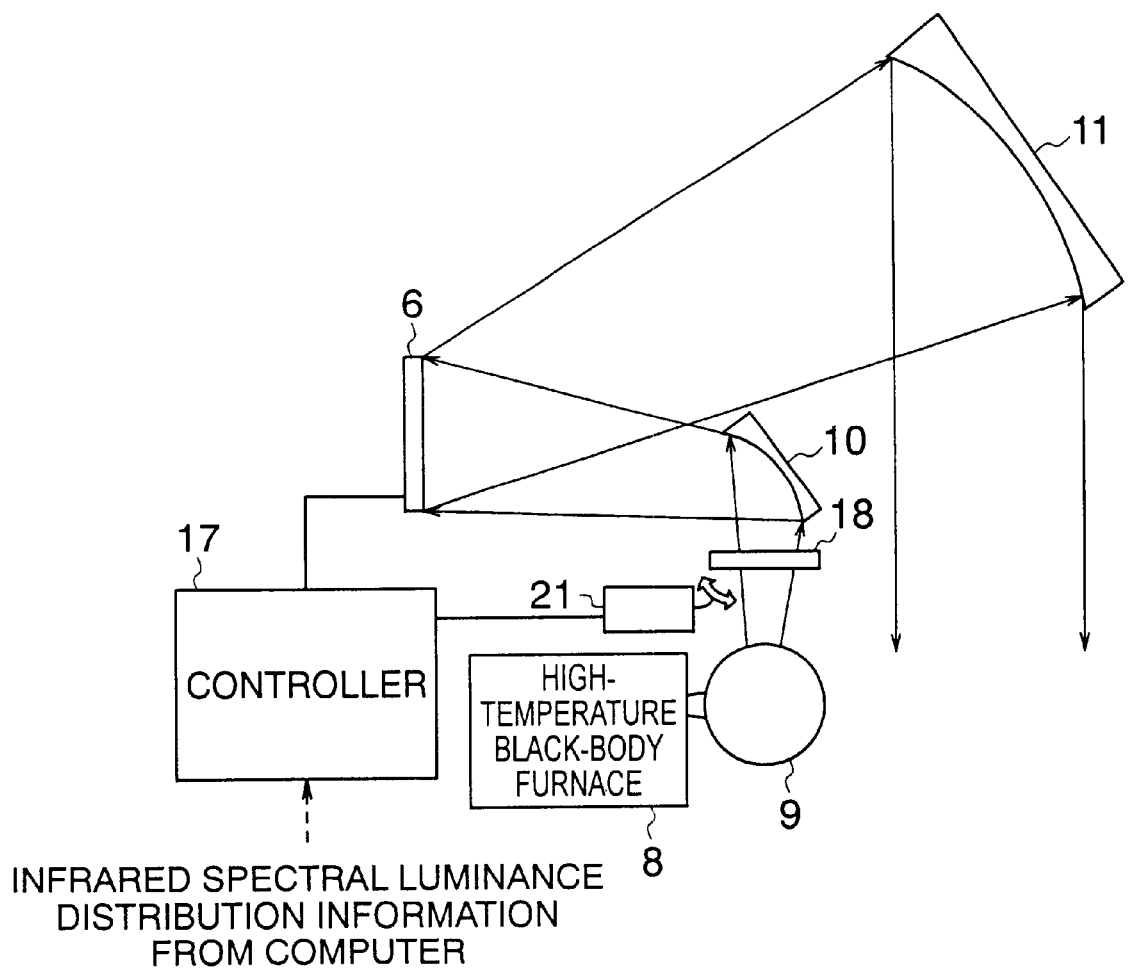
FIG. 4 shows the construction of an infrared projector according to another embodiment of the present invention.
Figure 5:
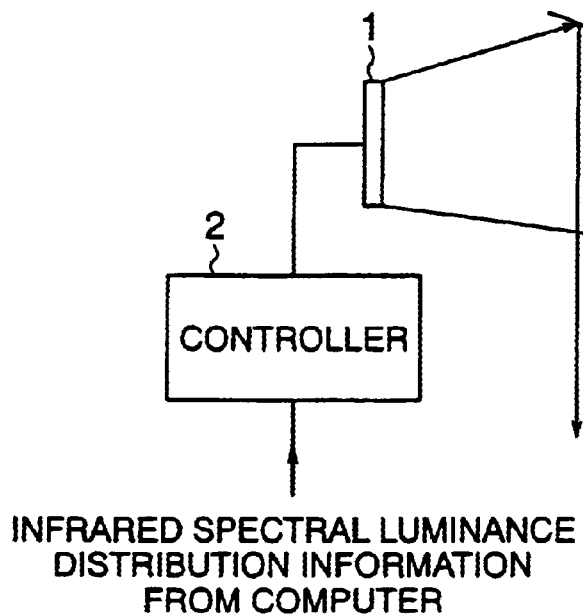
FIG. 5 shows the construction of a conventional infrared projector.
Figure 6:
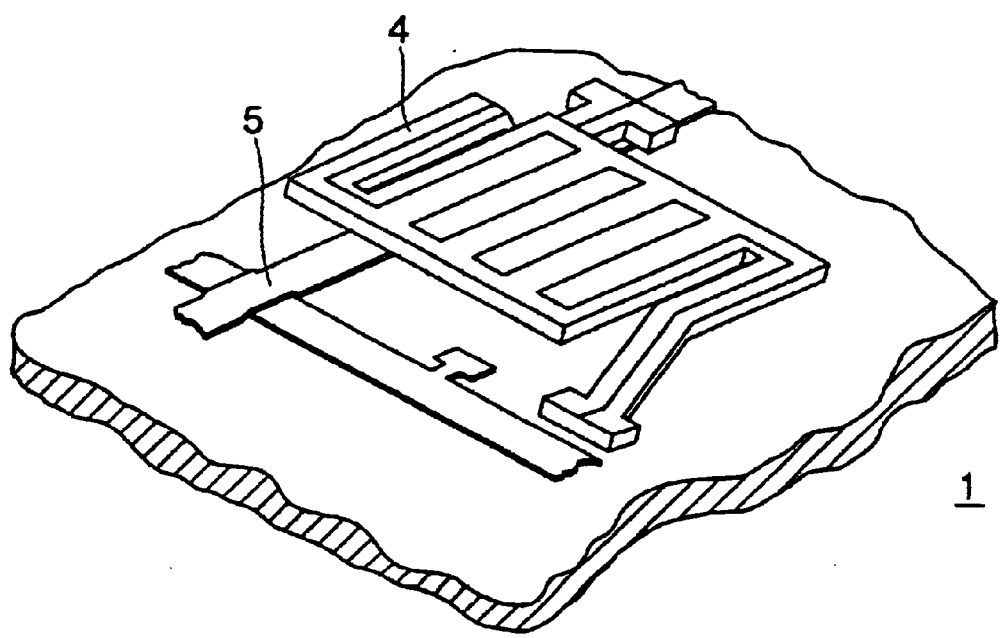
FIG. 6 is a perspective view showing part of a fine heating element array of the conventional infrared projector.
Figure 7:
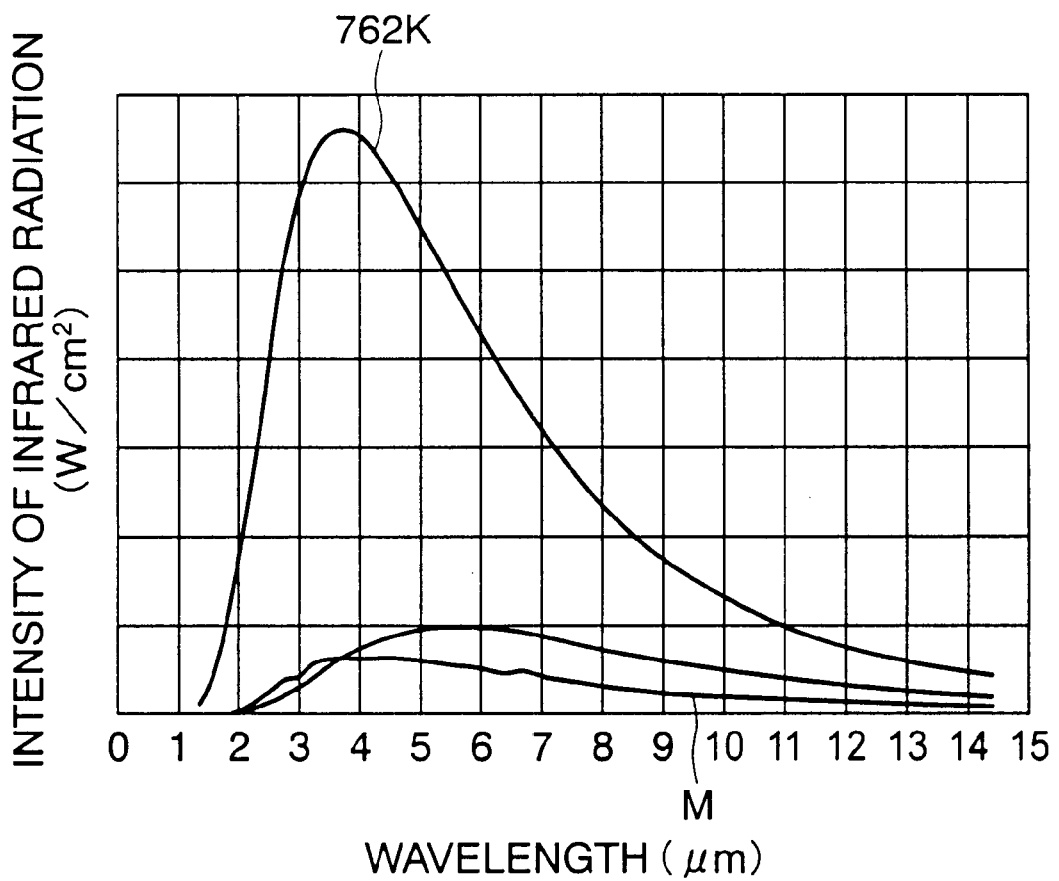
FIG. 7 shows the wavelength characteristic of the amount of infrared variation of the conventional device.

Moreover, in the above EMBODIMENT, the diffraction gratings 15 and 16 were used as optical elements for limiting the passband, but by using a prism 18 as shown in FIG. 4 instead of these, the prism may be fixed at a desired tilt using the movable supporting means 21.

Industrial Applicability

As described in the above, according to the present invention, an infrared projector comprises a micromirror device as an optical modulator for changing the direction of reflection by providing a plurality of mirrors and changing the direction of each of the plurality of mirrors independently, a controller for controlling the direction of each mirror of the micromirror device, and an infrared light source for irradiating the micromirror device with infrared light, and accordingly as the temporal response regarding the change of the intensity of infrared radiation is fast because the micromirror device is used and the mirrors for performing modulation are spatially densely arranged, the infrared projector can have a high temporal resolution and a high spatial resolution. Furthermore, as the aperture ratio is high and the reflectivity of the mirror is high, high-contrast simulation can be performed.

Furthermore, in an infrared projector, a high-temperature black-body furnace is provided as the infrared light source, and accordingly simulation of a high-temperature body such as a flame, etc., which was formerly not possible can be performed.

Furthermore, in an infrared projector, an infrared wavelength selection means for selecting the wavelength of infrared radiation incident on the micromirror device is provided, and accordingly not only the luminance characteristic, but also the wavelength characteristic can be simultaneously controlled.

Furthermore, in an infrared projector, two or more bandpass filters having different passbands are provided as the infrared wavelength selection means, and accordingly, the wavelength characteristic can be also simultaneously controlled by using the bandpass filters having different passbands.

Furthermore, in an infrared projector, a diffraction grating is provided as the infrared wavelength selection means, and accordingly, the wavelength characteristic can be also simultaneously controlled by the diffraction grating.

Furthermore, in an infrared projector, a movable supporting means for tilting the diffraction grating with respect to the incident direction of infrared radiation is provided as the infrared wavelength selection means, and accordingly the degree of freedom is given to the direction of irradiation of infrared radiation.

Furthermore, in an infrared projector, two or more diffraction gratings having different grating pitches are provided as the infrared wavelength selection means, and accordingly the luminance of each of the wavelengths which are divided can be accurately projected.

Furthermore, in an infrared projector, a prism is provided as the infrared wavelength selection means, and accordingly, the wavelength characteristic can be also controlled together with the luminance by using one prism.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Furthermore, in an infrared projector, a movable supporting means for tilting the prism with respect to the incident direction of infrared radiation is provided as the infrared wavelength selection means, and accordingly, the wavelength of infrared radiation can be easily selected.

What is claimed is:

1. An infrared projector for projecting a two-dimensional infrared radiation distribution pattern, the infrared projector comprising:

a micromirror device as an optical modulator for changing the direction of reflection by providing a plurality of mirrors and changing the direction of each of the plurality of mirrors independently;

a controller for controlling the direction of each mirror of the micromirror device;

an infrared light source for irradiating the micromirror device with infrared light; and an infrared wavelength selection means for adjustably selecting the wavelength of infrared radiation incident on the micromirror device;

the controller also controlling the infrared wavelength selection means such that the infrared radiation incident on the micromirror device has a desired wavelength characteristic.

2. An infrared projector as claimed in claim 1, wherein a high-temperature black-body furnace is provided as the infrared light source.

3. An infrared projector as claimed in claim 1, said infrared wavelength selection means including two or more bandpasS filters having different passbands.

4. An infrared projector as claimed in claim 2, said infrared wavelength selection means including two or more bandpass filters having different passbands.

5. An infrared projector as claimed in claim 1, said infrared wavelength selection means including a diffraction grating.

6. An infrared projector as claimed in claim 2, said infrared wavelength selection means including a diffraction grating.

7. An infrared projector as claimed in claim 5, said infrared wavelength selection means including moveable supporting means for tilting the diffraction grating with respect to the incident direction of infrared radiation.

8. An infrared projector as claimed in claim 6, said infrared wavelength selection means including moveable supporting means for tilting the diffraction grating with respect to the incident direction of infrared radiation.

9. An infrared projector as claimed in claim 1, said infrared wavelength selection means including two or more diffraction gratings having different grating pitches.

10. An infrared projector as claimed in claim 2, said infrared wavelength selection means including two or more diffraction gratings having different grating pitches.

11. An infrared projector as claimed in claim 7, said infrared wavelength selection means including two or more diffraction gratings having different grating pitches.

12. An infrared projector as claimed in claim 8, said infrared wavelength selection means including two or more diffraction gratings having different grating pitches.

13. An infrared projector as claimed in claim 1, said infrared wavelength selection means including a prism.

14. An infrared projector as claimed in claim 2, said infrared wavelength selection means including a prism.

15. An infrared projector as claimed in claim 13, said infrared wavelength selection means including a moveable supporting means for tilting the prism with respect to the incident direction of infrared radiation.

16. An infrared projector as claimed in claim 14, said infrared wavelength selection means including a moveable supporting means for tilting the prism with respect to the incident direction of infrared radiation.

17. An infrared projector as claimed in claim 1, the controller controlling the infrared wavelength selection means according to a spectral luminance distribution received by the controller.

18. An infrared projector as claimed in claim 1, said controller controlling the micromirror device based on the desired two-dimensional infrared radiation pattern and the infrared luminance in a passband of the infrared wavelength selection means.

19. An infrared projector as claimed in claim 1, said infrared light source including an integrating sphere for improving illumination uniformity of the infrared light.

20. An infrared image projecting device for projecting a two-dimensional infrared image, the infrared projector comprising:

an infrared light source, said infrared light source generating infrared light;

a micromirror device optically coupled to said infrared light source, said micromirror device including a plurality of mirrors capable of changing the direction of reflection for the infrared light incident thereon;

an infrared wavelength selecting device optically coupled to said infrared light source and said micromirror device; and a wavelength and luminance controller operatively connected to said infrared wavelength selecting device and said micromirror device, said wavelength and luminance controller controlling said infrared wavelength selecting device such that the infrared light has a desired wavelength characteristic, said wavelength and luminance controller controlling said micromirror device such that the two-dimensional infrared image projected from said micromirror device has a desired luminance pattern.

21. The infrared image projecting device as claimed in claim 20, said wavelength and luminance controller controlling said infrared wavelength selecting device according to a spectral luminance distribution received by said wavelength and luminance controller.

22. The infrared image projecting device as claimed in claim 20, said wavelength and luminance controller controlling said micromirror device based on a two-dimensional infrared radiation pattern and the infrared luminance in a passband of said infrared wavelength selecting device.

* * * * *